US009228503B2

(12) United States Patent
Haeming et al.

(10) Patent No.: US 9,228,503 B2
(45) Date of Patent: Jan. 5, 2016

(54) METHOD AND DEVICE FOR HANDLING UNCONTROLLED COMBUSTIONS IN AN INTERNAL COMBUSTION ENGINE OF A MOTOR VEHICLE

(75) Inventors: Werner Haeming, Neudenau (DE); Juergen Wuerth, Freiberg (DE); Carsten Kluth, Stuttgart (DE); Li Luo, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 392 days.

(21) Appl. No.: 13/636,997

(22) PCT Filed: Mar. 16, 2011

(86) PCT No.: PCT/EP2011/053934
§ 371 (c)(1),
(2), (4) Date: Nov. 30, 2012

(87) PCT Pub. No.: WO2011/117122
PCT Pub. Date: Sep. 29, 2011

(65) Prior Publication Data
US 2013/0096809 A1  Apr. 18, 2013

(30) Foreign Application Priority Data

Mar. 25, 2010 (DE) .......................... 10 2010 003 285
Dec. 27, 2010 (DE) .......................... 10 2010 064 186

(51) Int. Cl.
*G01M 15/12* (2006.01)
*F02D 13/02* (2006.01)
(Continued)

(52) U.S. Cl.
CPC ............ *F02D 13/02* (2013.01); *F02D 13/0219* (2013.01); *F02D 13/0261* (2013.01);
(Continued)

(58) Field of Classification Search
CPC . G01M 15/12; G01L 23/222; F02D 2200/025
USPC ................ 701/111; 123/435, 406.21, 406.27, 123/406.29, 406.38, 406.39
See application file for complete search history.

(56) References Cited

U.S. PATENT DOCUMENTS 4,648,367 A * 3/1987 Gillbrand et al. ........ 123/406.26
5,230,316 A   7/1993 Ichihara et al.
(Continued)

FOREIGN PATENT DOCUMENTS

CN    101360905    2/2009
CN    101413449    4/2009
(Continued)

OTHER PUBLICATIONS

International Search Report, PCT International Application No. PCT/EP2011/053934, dated Nov. 7, 2011.

*Primary Examiner* — Erick Solis
(74) *Attorney, Agent, or Firm* — Kenyon & Kenyon LLP

(57) ABSTRACT

A method for handling uncontrolled combustions in an internal combustion engine of a motor vehicle, the uncontrolled combustions occurring independently of the ignition by a spark plug and being detected in or at the internal combustion engine. To allow a rapid yet reliable reduction of uncontrolled combustions in an internal combustion engine in order to protect the internal combustion engine from damage, the number of detected uncontrolled combustions in a monitoring period is determined and compared to a threshold value. A temperature in a combustion chamber of the internal combustion engine is dropped if the threshold value is exceeded.

13 Claims, 3 Drawing Sheets

(51) Int. Cl.
  *G01L 23/22* (2006.01)
  *F02D 35/02* (2006.01)
  *F02P 5/152* (2006.01)
  *F02D 41/00* (2006.01)
  *F02D 41/30* (2006.01)

(52) U.S. Cl.
  CPC ............... *F02D35/027* (2013.01); *F02P 5/152* (2013.01); *G01L 23/222* (2013.01); *G01M 15/12* (2013.01); *F02D 41/0002* (2013.01); *F02D 41/006* (2013.01); *F02D 41/008* (2013.01); *F02D 41/30* (2013.01); *F02D 2200/025* (2013.01); *Y02T 10/18* (2013.01); *Y02T 10/46* (2013.01)

(56) References Cited

U.S. PATENT DOCUMENTS

| | | | |
|---|---|---|---|
| 5,421,304 A | 6/1995 | Gibtner et al. | |
| 5,632,247 A | 5/1997 | Hashizume et al. | |
| 5,738,074 A * | 4/1998 | Nakamura et al. | 123/305 |
| 5,905,193 A * | 5/1999 | Hashizume et al. | 73/35.09 |
| 6,246,952 B1 * | 6/2001 | Honda | 701/111 |
| 8,245,692 B2 * | 8/2012 | Glugla | F02D 35/027 123/406.29 |
| 8,406,984 B2 * | 3/2013 | Glugla et al. | 701/111 |
| 8,447,502 B2 * | 5/2013 | Rollinger et al. | 701/111 |
| 8,635,005 B2 * | 1/2014 | Hagari et al. | 701/111 |
| 8,683,976 B2 * | 4/2014 | Cunningham et al. | 123/434 |
| 8,851,050 B2 * | 10/2014 | Shishime | F02D 13/0238 123/406.29 |
| 9,043,122 B2 * | 5/2015 | Glugla | F02D 43/00 123/406.18 |
| 2003/0164026 A1 | 9/2003 | Koseluk et al. | |
| 2003/0164164 A1 * | 9/2003 | Butler, Jr. | 123/606 |
| 2004/0084036 A1 * | 5/2004 | Porter et al. | 123/634 |
| 2007/0215107 A1 | 9/2007 | Shelby et al. | |
| 2008/0289602 A1 | 11/2008 | Haug et al. | |
| 2009/0043478 A1 | 2/2009 | Labonte | |
| 2009/0095250 A1 | 4/2009 | Kuzuyama | |
| 2009/0248271 A1 | 10/2009 | Kuzuyama et al. | |
| 2009/0276147 A1 * | 11/2009 | Hamama et al. | 701/111 |
| 2009/0308146 A1 * | 12/2009 | Gautrot et al. | 73/114.07 |

FOREIGN PATENT DOCUMENTS

| | | |
|---|---|---|
| DE | 696 28 770 | 4/2004 |
| DE | 10 2007 024 415 | 1/2009 |
| EP | 0 819 925 | 1/1998 |
| JP | 1-88042 | 6/1989 |
| JP | 4-101068 | 4/1992 |
| JP | 8-319931 | 12/1996 |
| JP | 10-30977 | 2/1998 |
| JP | 11-50940 | 2/1999 |
| JP | 11-93757 | 4/1999 |
| JP | 2000-97061 | 4/2000 |
| JP | 2004-243924 | 9/2004 |
| JP | 2005-9457 | 1/2005 |
| JP | 2008-64058 | 3/2008 |
| JP | 2009-30545 | 2/2009 |
| JP | 2009-150306 | 7/2009 |

* cited by examiner

METHOD AND DEVICE FOR HANDLING UNCONTROLLED COMBUSTIONS IN AN INTERNAL COMBUSTION ENGINE OF A MOTOR VEHICLE

FIELD OF THE INVENTION

The present invention relates to a method and device for handling uncontrolled combustions in an internal combustion engine of a motor vehicle, the uncontrolled combustions occurring independently of the ignition by a spark plug and being detected in or at the internal combustion engine.

BACKGROUND INFORMATION

In a gasoline engine, the vehicle is set in driving operation and/or the driving operation is maintained as the result of combustion of the supplied fuel-air mixture. The combustion of the fuel-air mixture is initiated by the ignition spark of a spark plug. The ignition spark forms a flame front which propagates in the entire combustion chamber, and the air-fuel mixture that is present is converted into kinetic energy during the combustion. For knocking combustions, a portion of the combustions proceed suddenly and cause a great pressure rise in the combustion chamber of the gasoline engine which generates a pressure wave that propagates and strikes the walls delimiting the combustion chamber, where the high-frequency oscillations are converted into structure-borne noise. These oscillations are detected by knock sensors (structure-borne noise sensors) and taken into account in controlling the gasoline engine by knock control in order to prevent engine damage. The gasoline engine is always operated at the knock limit in an efficiency-optimized manner. Damage to the gasoline engine as the result of the continually recurring knocking combustions is avoided with the aid of the knock control.

However, in addition to the described knocking combustions, auto-ignitions occur as the result of hot spots in the combustion chamber, oil droplets, or hot residual gas zones in the fuel-air mixture. Such auto-ignitions may appear as pre-ignitions before the ignition spark occurs, and as post-ignitions after the ignition spark occurs. One or multiple additional flame fronts arise in addition to the flame front induced by ignition sparks. These auto-ignitions are usually referred to as pre-ignitions, and increase the risk of knocking combustions in the end-gas zone. The structure-borne noise oscillations which occur are characterized by extreme pressure amplitudes, which may very quickly result in engine damage.

German Patent Application No. DE 696 28 770 T2 describes that such anomalous auto-ignitions may be recognized in that the amplitude of an auto-ignition is larger than a predefined threshold value, the auto-ignition being recognized in two steps: once after a first predetermined time period after the ignition has elapsed, and in a second step after a second predetermined time period, which is longer than the first predetermined time period, has elapsed. To minimize the auto-ignitions, after the anomalous auto-ignition has been identified, the amount of fuel injected is increased or decreased, or a throttle valve is closed. Determining the auto-ignitions requires a great expenditure of computing time, which delays a quick response to the anomalous auto-ignitions.

SUMMARY

An object of the present invention, therefore, is to provide a method and a device which allow a rapid yet reliable reduction of uncontrolled combustions in an internal combustion engine in order to protect the internal combustion engine from damage.

According to an example embodiment of the present invention, the number of detected uncontrolled combustions in a monitoring period is determined and compared to a threshold value, a temperature in a combustion chamber of the internal combustion engine being lowered if the threshold value is exceeded. This has the advantage that the combustions of the internal combustion engine in the past are taken into account in the initiation of measures against the uncontrolled combustions, and the sporadic combustion events are evaluated. Depending on whether the uncontrolled combustions occur one or multiple times during the monitoring period or even in series, a response is made via suitable measures for reducing the uncontrolled combustions, and therefore the actual engine behavior is taken into account. Counting the number of uncontrolled combustions allows a particularly simple implementation of the method by software or also by hardware. With the aid of the measure for reducing the uncontrolled combustion, the temperature in the combustion chamber of the internal combustion engine is lowered, thus reducing or completely preventing the sudden conversion of energy in the combustion chamber, which is extremely damaging to the engine. In this way, hot spots in the combustion chamber or hot spots in the fuel-air mixture are cooled, and the occurrence of uncontrolled combustions is thus reduced.

The threshold value may be advantageously variably adjustable. Thus, the instantaneous situation in the combustion chamber of the internal combustion engine may be taken into account at any time, it being possible to initiate the measures for reducing the uncontrolled combustions at different points in time due to the variable threshold value, thus allowing a quick response to uncontrolled combustions which occur.

In another variant, the counted uncontrolled combustions are stored for a limited period of time, the stored uncontrolled combustions being taken into account in determining the number of uncontrolled combustions. Simple implementation is possible by using a counter which counts the recognized uncontrolled combustions. The counter for the recognized uncontrolled combustions is designed with an adjustable, time-limited memory. Recognized uncontrolled combustions from a fairly long time in the past are removed from the counter. This is easy to implement with the aid of a counter which increments when uncontrolled combustions are recognized, and once again decrements after a predefined period of time. Countermeasures against the combustions occurring in an uncontrolled manner may thus be initiated very flexibly. If a long period of time is selected for the decrementation, uncontrolled combustions from a fairly long time in the past are also taken into account. If the period of time for the decrementation is selected to be short, the uncontrolled combustions farther back in time are no longer taken into account for the initiation of measures.

In one example embodiment, the monitoring period is within a driving cycle of the motor vehicle. In the current context, the driving cycle of the motor vehicle is to be understood to mean the period of time that elapses between switching on the ignition of the motor vehicle and switching off the internal combustion engine. For a setting of the monitoring period within the driving cycle, short-term measures are triggered for preventing the uncontrolled combustions, since these measures act only in the instantaneous driving cycle, which is the case in particular when individual uncontrolled combustions occur. The possibility of damage to the internal combustion engine is thus reduced.

Alternatively, the monitoring period spans at least one driving cycle of the motor vehicle. This application is advantageous whenever the internal combustion engine is once again producing uncontrolled combustions within a short period of time after short-term measures have expired. As a result of the uncontrolled combustions, which have occurred in multiple driving cycles of the motor vehicle, being monitored over a fairly long period of time for this long-term measure, the uncontrolled combustions may be handled in a particularly accurate manner, and recurring, uncontrollable combustions may also be reliably avoided over a fairly long period of time, thus further reducing the risk of damage to the internal combustion engine.

In one refinement, the temperature in the combustion chamber of the internal combustion engine is lowered by fuel enrichment in the internal combustion engine. By enriching the fuel-air mixture which is present in the combustion chamber of the internal combustion engine, on the one hand the combustibility is limited by the practically constant air mass, and on the other hand the fuel-air mixture is cooled more intensely due to the occurring evaporation of most of the fuel quantity.

In another example embodiment, the temperature in the combustion chamber of the internal combustion engine is lowered by air enrichment in the internal combustion engine. The air quantity which does not take part in the combustion has a cooling effect. Likewise, the leaner mixture results in slower combustion of the fuel-air mixture, so that uncontrolled combustions have a less intense effect on the internal combustion engine.

In another variant, the temperature in the combustion chamber of the internal combustion engine is lowered by decreasing the charge to the internal combustion engine by reducing the air supply. This is achieved by moving the throttle valve in the direction of the closed state, thus preventing further penetration of air into the internal combustion engine and thus reducing the combustion, which also has a positive effect on the uncontrolled combustions due to lower temperatures.

The temperature in the combustion chamber of the internal combustion engine is advantageously lowered by reducing an internal residual gas in the internal combustion engine by slightly overlapping the activation times of the intake valves and/or the exhaust valves of the internal combustion engine. Adjustable camshafts are a prerequisite for these adjustments. In this regard, at least one camshaft for the intake valves or the exhaust valves must be adjustable. It is advantageous if both camshafts are adjustable, and therefore the control times for the intake valves and exhaust valves are adjustable. This procedure allows a very versatile response to uncontrolled combustions, since the overlaps may be set quickly via software. Because the intake valve is already open while the exhaust valve is not yet closed, the temperature level in the combustion chamber of the internal combustion engine is lowered. In the overlapping reduction of the activation times, maximum impacts of the intake valve or exhaust valve may be assumed, or only certain opening states of the valves are taken into account.

In one example embodiment, the uncontrolled combustions are detected based on the structure-borne noise oscillations of the internal combustion engine. Since the structure-borne noise oscillations in an internal combustion engine are already evaluated for detecting controlled combustions, and therefore an appropriate sensor system is present, further outlay for hardware for determining the uncontrolled combustions may be dispensed with, resulting in a cost-effective implementation of the method. It is necessary only to carry out an additional evaluation of the signals which are already present.

In particular, for detecting the uncontrolled combustions, a measuring window is activated as a function of the position of the structure-borne noise oscillations in comparison to a first crankshaft angular range, which in particular is different from a second crankshaft angular range in which knock events of a controlled combustion are expected. Since uncontrolled combustions which are triggered by the ignition spark generated by a spark plug occur before and during a controlled combustion, in addition to the measuring window for controlled combustions which is a function of the ignition angle of the crankshaft, for the evaluation it is necessary only to generate a second measuring window in which severe knocking combustions caused by uncontrolled combustions are expected. In this second measuring window, the knock sensor signal which is present is evaluated with the aid of the evaluation algorithms which are present.

One embodiment which is particularly advantageous has one or multiple additional thresholds, in particular below the threshold value, and when these thresholds are exceeded, other, in particular fairly moderate, measures may be initiated. An appropriate response to various intensities/frequencies of the pre-ignition detection may thus be made in a more flexible manner. Uncontrolled combustions already below the threshold value may cause engine damage, and may be avoided or reduced by initial fairly moderate measures when a fairly low threshold is exceeded. However, the use of measures which are fairly moderate, i.e., reduced in intensity or duration, results in little or no sacrifice in comfort for the driver.

One refinement of the present invention relates to a device for handling uncontrolled combustions in an internal combustion engine of a motor vehicle, the uncontrolled combustions occurring independently from the ignition by a spark plug and being detected in or at the internal combustion engine. To allow a rapid yet reliable reduction of uncontrolled combustions in an internal combustion engine and to protect the internal combustion engine from damage, means are present which determine the number of detected uncontrolled combustions in a monitoring period and compare same to a threshold value, the temperature in a combustion chamber of the internal combustion engine being lowered if the threshold value is exceeded. This has the advantage that the combustions of the internal combustion engine in the past are also taken into account as a function of the time period set for decrementing the counter, in that sporadic combustion events are evaluated. Depending on whether the uncontrolled combustions occur one or multiple times during the monitoring period or even in series, a response is made via suitable measures for reducing the uncontrolled combustions, and therefore the actual engine behavior is taken into account. Counting the number of uncontrolled combustions allows a particularly simple implementation of the example method by software or also by hardware.

A knock sensor is advantageously connected to a control unit which has a counter for summing the signals output by the knock sensor, a threshold value being stored in a memory of the control unit, and the control unit controlling an actuator for changing the temperature in the internal combustion engine if the sum detected by the counter exceeds the threshold value. As a result of this simple hardware measure, future uncontrolled combustions are prevented by accurately taking into account the uncontrolled combustions which have occurred in the past, thus protecting the internal combustion engine from damage.

In one example embodiment, each cylinder of the internal combustion engine has an intake valve for the intake of air, and an exhaust valve for discharge of a combustion exhaust gas, as actuators, the opening times of which are set by a separate camshaft in each case, the control unit controlling the camshafts in such a way that the opening times of the intake valve and of the exhaust valve slightly overlap. As a result of reducing the overlap of the valve opening times, the internal residual gas present in the combustion chamber of the internal combustion engine is reduced, thus lowering the temperature level in the combustion chamber. The control of the intake valve and of the exhaust valve of a cylinder with less overlap represents a simple software measure.

The present invention allows numerous exemplary embodiments, one of which is explained in greater detail with reference to the figures.

DETAILED DESCRIPTION OF EXAMPLE EMBODIMENTS

Figure 1:
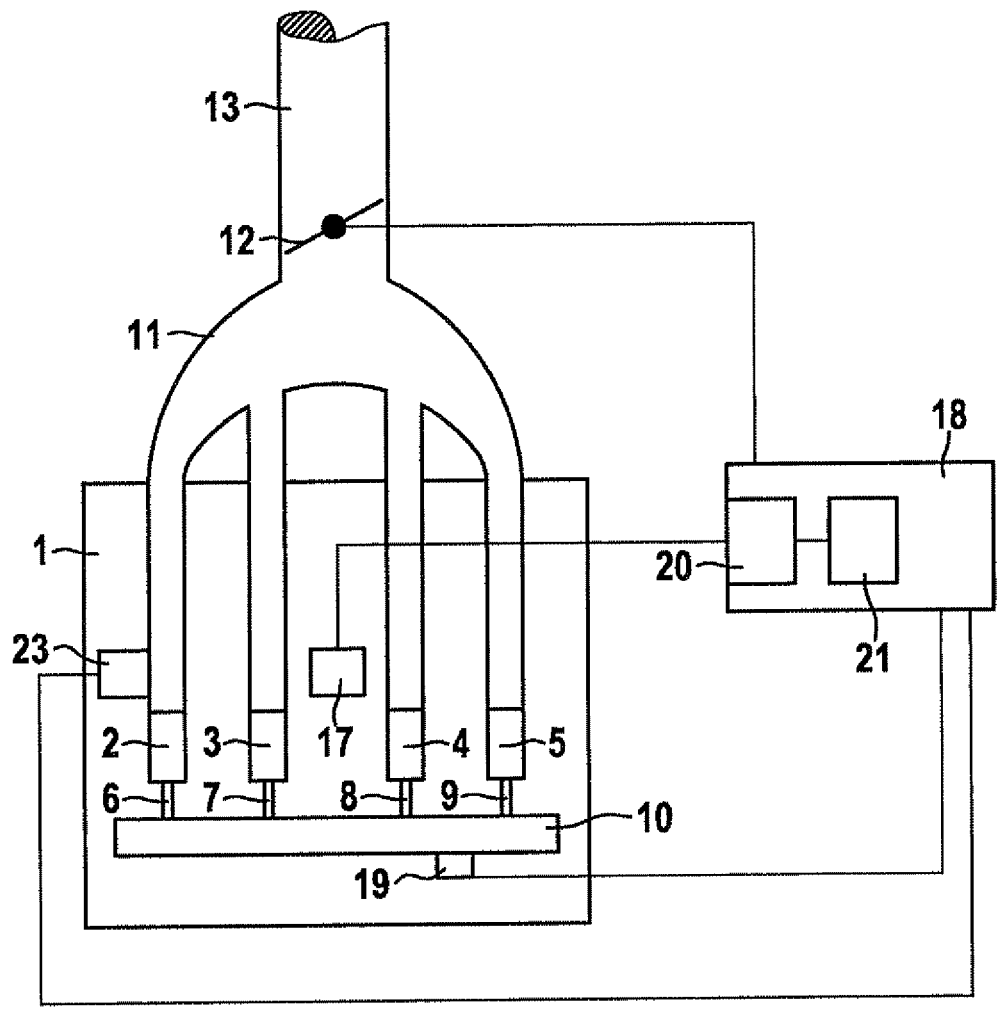
FIG. 1 shows a device for detecting and reducing uncontrolled combustions in a gasoline engine.

Identical features are denoted by the same reference numerals.

Figure 2:
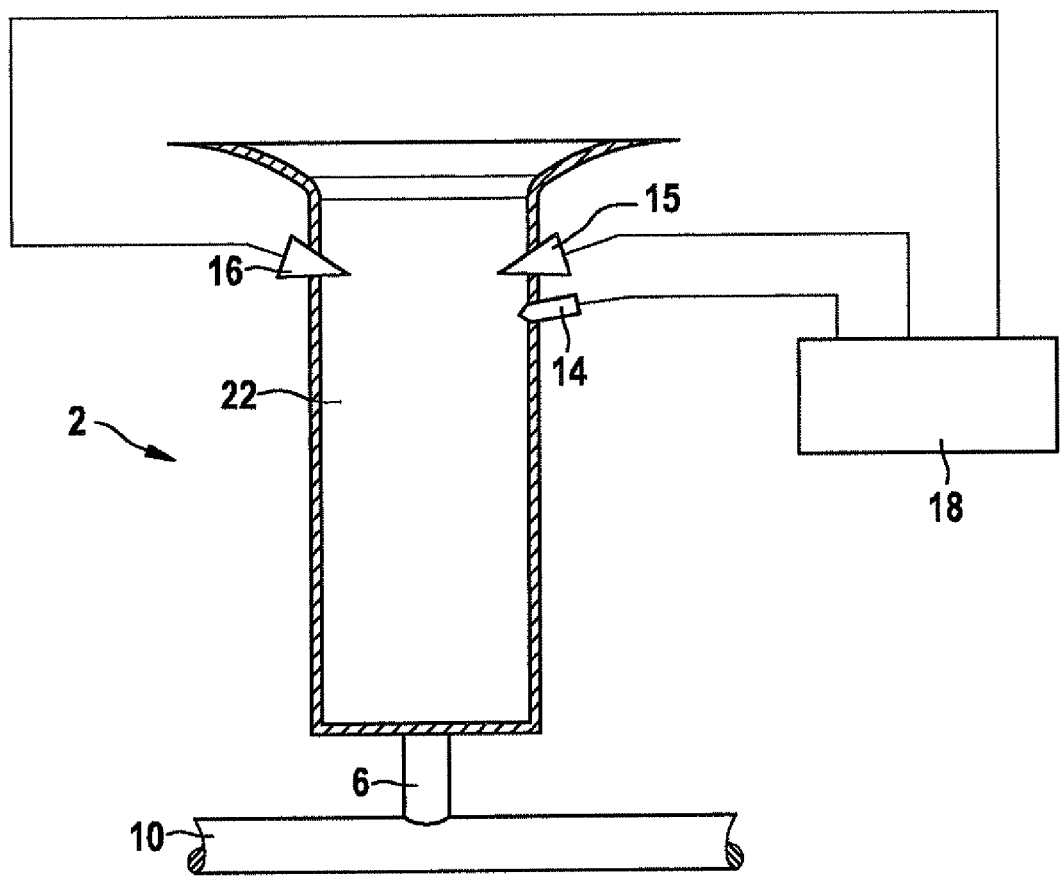
FIG. 2 shows a schematic diagram of a cylinder of the gasoline engine according to FIG. 1.

FIG. 1 shows a device for detecting and evaluating a combustion in a gasoline engine 1. In this example, gasoline engine 1 has four cylinders 2, 3, 4, 5 whose pistons, not illustrated in greater detail, which move in cylinders 2, 3, 4, 5, are each connected to crankshaft 10 via a connecting rod 6, 7, 8, 9, respectively, and drive the crankshaft due to pressure changes caused by the combustions. Cylinders 2, 3, 4, 5 are connected to an intake manifold 11, which is closed off with respect to an air intake pipe 13 by a throttle valve 12. A nozzle 14 for injecting fuel, thus forming a fuel-air mixture, protrudes into each cylinder 2, 3, 4, 5. In addition, each cylinder 2, 3, 4, 5 has an intake valve 15 for the fresh air and an exhaust valve 16 for the exhaust gases generated during the combustion process, as illustrated in FIG. 2 only for cylinder 2 as an example. Intake valve 15 is operated by an intake camshaft, and the exhaust valve is operated by an exhaust camshaft, which for the sake of clarity are not illustrated in greater detail.

A knock sensor 17 is situated at gasoline engine 1, and detects the structure-borne noise oscillations of gasoline engine 1 which are caused by the combustions in gasoline engine 1. The signals of knock sensor 17 are relayed to a control unit 18, which is also connected to a crankshaft sensor 19 situated opposite from crankshaft 10, control unit 18 associating the combustions with the signal of crankshaft sensor 19, which provides a crankshaft angle. In addition, control unit 18 is connected to throttle valve 12, to fuel injection nozzle 14, and to intake valve 15 and exhaust valve 16 of each cylinder 2, 3, 4, 5. For recognition of first cylinder 2, a phase sensor 23 which likewise is connected to control unit 18 is mounted on first cylinder 2.

When throttle valve 12 is open, the fresh air flows into intake manifold 11 and via intake valve 15 is introduced into cylinders 2, 3, 4, 5. In addition, fuel is injected by the particular fuel injection nozzle 14 into cylinders 2, 3, 4, 5. A spark, triggered by a spark plug, not illustrated in greater detail, initiates a combustion in cylinders 2, 3, 4, 5 in succession, causing a pressure rise in cylinders 2, 3, 4, 5 which is transmitted via the piston and connecting rod 6, 7, 8, 9 to crankshaft 10, setting the crankshaft in motion.

In addition to the controlled combustions, which are generally free of knocks and which also may have knocks only infrequently, combustions occur which have a very early combustion initiation, or have combustion positions. These combustions are referred to as uncontrolled combustions or pre-ignitions. Compared to normal combustions, such a pre-ignition has significantly higher pressures and temperatures which are damaging to gasoline engine 1.

Figure 3:
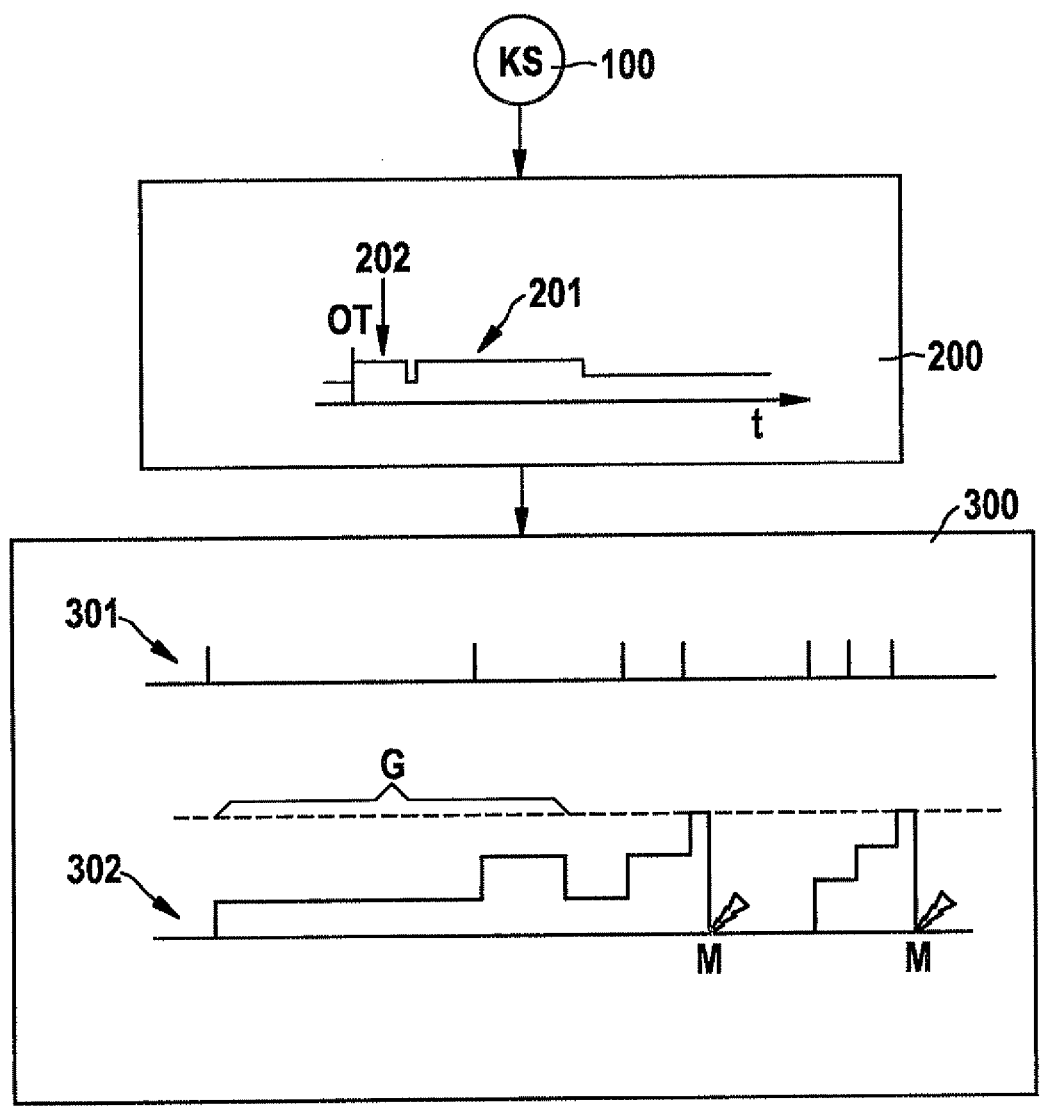
FIG. 3 shows a schematic flow chart for detecting and reducing an uncontrolled combustion.

For recognizing and reducing the pre-ignitions, in principle three steps are carried out, as shown in FIG. 3. As the result of the structure-borne noise oscillations caused by the combustions, in step 100 knock sensor 17 continuously or at predefined time intervals generates an output signal, which is set by control unit 18 in relation to the crankshaft angle which is output by crankshaft sensor 19. The knocking combustions may thus be associated with the particular cylinder 2, 3, 4, 5 in which the combustions occur.

In block 200, control unit 18 analyzes the output signal of knock sensor 17 in a predefined measuring range for the occurrence of severe knock events caused by pre-ignitions. For this purpose, in addition to a first measuring window 201 for detecting knocking events of the normal combustions caused by the spark plug, the evaluation algorithm of control unit 18 has a second measuring window 202 which is situated with respect to time before first measuring window 201. As illustrated in FIG. 3, second measuring window 202 for detecting the severe knock events caused by pre-ignitions starts when the piston of the particular cylinder 2, 3, 4, 5 reaches top dead center OT, and ends before first measuring window 201 opens. Alternatively, however, second measuring window 202 may be opened before the top dead center is reached, thus improving the reliability in detecting severe knocking combustions from pre-ignitions in the advanced state.

The severe knock events are recognized in control unit 18 with the aid of conventional algorithms for knock recognition. In the present case, the detected sensor signal is filtered in one or multiple frequency ranges, then rectified and integrated. The integrated value thus obtained is set in relation to a reference value which represents pre-ignition-free operation. If this relation exceeds a threshold value, a pre-ignition is recognized.

If a pre-ignition has been recognized, the example method skips to step 300, in which reduction measures are initiated. A distinction may be made between various measures, which are carried out either individually or in combination. These measures include switching off fuel injector 14 at affected cylinder 2, 3, 4, 5, or cooling combustion chamber 22 of cylinder 2, 3, 4, 5 by fuel enrichment, fresh air enrichment, or charge reduction.

Pre-ignitions may be reduced in a particularly convenient manner by reducing the internal residual gas in cylinder 2, 3, 4, 5. Intake valve 15 and exhaust valve 16 are driven by their camshafts in such a way that the opening times of both valves 15, 16 in the OT charge cycle do not overlap. The camshafts are controlled by control unit 18 exactly in the same way as for throttle valve 12 for reducing the air supply, and for fuel injector 14. As a result of the reduced valve overlap, intake valve 15 is not opened until exhaust valve 16 is closed, whereby the residual gas present in cylinder 2, 3, 4, 5 is reduced and the temperature level in cylinder 2, 3, 4, 5 drops. If only the intake camshaft is variably adjustable, the control point in time for intake valves 15 is retarded. This means that intake valves 15 do not open until the piston of the particular cylinder 2, 3, 4, 5 has already passed top dead center OT, which represents the highest point which the piston is able to reach in cylinder 2, 3, 4, 5, and is once again in downward motion. If gasoline engine 1 has only adjustable exhaust valve control times, the control point in time of exhaust valves 16 is advanced, i.e., before the piston of cylinder 2, 3, 4, 5 in its upward motion reaches top dead center OT. If intake valves 15 as well as exhaust valves 16 are variable, the control point in time of exhaust valves 16 is advanced, and the control point in time of intake valves 15 is retarded. The maximum impacts of valves 15, 16, or only a certain delta in the opening of valves 15, 16, may be taken into account.

There are various options for initiating the measures for reducing the pre-ignitions. Thus, in one simple variant, after each detection of a pre-ignition, one or more of the above-discussed options is/are triggered by control unit 18, in which either fuel injection nozzle 14 is activated and/or throttle valve 12 is adjusted and/or the control points in time of intake valve 15 and of exhaust valve 16 are varied.

A functionality having a settable "memory" G from the past is particularly advantageous, in which a counter 20 present in control unit 18 counts the sporadically occurring pre-ignitions, as illustrated in diagram 301 in FIG. 3, where the individual pre-ignitions are represented as a function of time t. The number of counted pre-ignitions is compared to a threshold value SW which is stored in memory 21 of control unit 18. If the number of counted pre-ignitions exceeds threshold value SW, control unit 18 triggers one or more of measures M discussed above, with the intent of preventing further pre-ignitions (see diagram 302). After a settable period of time, counter 20 is decremented, when pre-ignitions further back in time are no longer to be taken into account.

Threshold value SW may be varied as a function of the rotational speed and/or load, so that the evaluation is always based on the given conditions in the particular cylinders 2, 3, 4, 5.

Such a functionality may be used for short-term measures as well as for long-term measures for preventing or diminishing pre-ignitions. Individual recognized pre-ignitions are initially responded to with short-term measures such as enrichment or leaning of the fuel-air mixture, reducing the charge, or minimizing the residual gas. These short-term measures are effective only in one driving cycle of the motor vehicle for a specified period of time or a predefined number of working cycles, and range over a time frame of several seconds. The time period from switching on the ignition of the motor vehicle to switching off gasoline engine 1 is considered as the driving cycle.

However, if it turns out that gasoline engine 1 is once again generating pre-ignitions a short time after the short-term measures, this would be harmful to gasoline engine 1 over the long term. In this case, long-term measures are activated which are active over multiple driving cycles, and which may therefore last several hours. The number of pre-ignitions counted in each driving cycle is stored in memory 21 of control unit 18 after the gasoline engine is switched off, the counting of the pre-ignitions being continued, on the basis of the stored number of superknocks, after the ignition is switched on. Also for the long-term measures, a measure M for reducing further pre-ignitions is initiated when the number of counted pre-ignitions reaches a threshold value SW. Charge reduction and residual gas minimization are particularly suitable. Enrichment or leaning of the fuel-air mixture is also possible.

In another embodiment, a multistage, in particular a two-stage, pre-ignition recognition having appropriate countermeasures, or a detection and handling device suitable for this purpose, is provided. This may result in more effective prevention of engine damage, since it is the uncontrolled combustions, i.e., pre-ignitions, which occur before the above-described threshold is reached and countermeasures are initiated, that cause engine damage.

In such a multistage pre-ignition recognition, preferably moderate countermeasures are initiated when a first threshold is exceeded. Fairly moderate countermeasures refer to those which result in the temperature in combustion chamber 22 of internal combustion engine 1 being dropped to a lesser extent than when the threshold value is exceeded. If any further threshold is exceeded, the countermeasures are intensified until a maximum threshold is exceeded, which results in initiation of the maximum countermeasures (maximum temperature drop). In one particular embodiment, a two-stage pre-ignition recognition is assumed. Combustions which exceed only the first pre-ignition threshold result in a suspected pre-ignition. Based on this suspicion, first measures are already initiated in order to subsequently prevent genuine, or further, pre-ignitions which could once again be damaging to the engine. If further or genuine pre-ignitions in fact occur, these are detected when the second threshold is exceeded, and trigger further measures, such as those described above in the other exemplary embodiments for the exceedance of only one threshold.

Thus, there are three classes of pre-ignition recognition: (1) no pre-ignition is detected, (2) pre-ignition is suspected, (3) pre-ignition is detected. As previously mentioned, a multi-stage recognition having further staged countermeasures may also be provided, for example: (a) no pre-ignition is detected, (b) slight suspicion, (c) strong suspicion, (d) pre-ignition is detected, (e) severe pre-ignition is detected. In this latter example, an additional threshold ((e), severe pre-ignition is detected) above the main threshold value is provided.

As described, for the lower threshold (or for the lower thresholds for a functionality having more than two stages) fairly moderate countermeasures are activated which ideally are not perceivable by the vehicle driver.

Such countermeasures may be implemented, for example, by a (preferably) slight enrichment and/or a (preferably slight) residual gas reduction and/or a change in the injection timing; in particular, it is also possible to take only individual measures here. These measures may already be initiated when a single combustion exceeds the first (or the corresponding lower) threshold. However, the above-described "memory functionality" is also particularly advantageous here; i.e., the detection is carried out, for example, by a counter which is once again decremented after a certain period of time.

If the second threshold (or the highest threshold) is exceeded, this is classified as an actually detected pre-ignition. To prevent further pre-ignitions, more aggressive countermeasures, which are a combination of multiple countermeasures or also the combination of all available countermeasures, may be activated. This may be achieved, for example, by greater enrichment or greater residual gas minimization compared to the first threshold (or to the lower thresholds). Possible countermeasures could then also include charge reduction or injector deactivation. As described, several of these countermeasures may also be combined.

What is claimed is:

1. A method for handling uncontrolled combustions in an internal combustion engine of a motor vehicle, the method comprising:

providing, during a monitoring period, a first measuring window for detecting knocking events of normal combustions caused by the spark plug and a second measuring window which is situated with respect to time before the first measuring window for detecting uncontrolled combustions independent from the ignition by a spark plug, wherein the uncontrolled combustions occur independently of ignition by a spark plug and being detected in or at the internal combustion engine; and determining a number of detected uncontrolled combustions independent from the ignition by a spark plug in a monitoring period and comparing the number to a threshold value, a temperature in a combustion chamber of the internal combustion engine being dropped if the threshold value is exceeded;

wherein the uncontrolled combustions are detected based on structure-borne noise oscillations of the internal combustion engine and for detecting the uncontrolled combustions, a measuring window is activated as a function of the position of the structure-borne noise oscillations in comparison to a first crankshaft angular range, which is different from a second crankshaft angular range in which knock events of a controlled combustion are expected; and wherein if the at least one further threshold which is below the threshold value is exceeded, the temperature in the combustion chamber of the internal combustion engine is dropped to a lesser extent than when the threshold value is exceeded.

2. The method as recited in claim 1, wherein the threshold value is variably adjustable.

3. The method as recited in claim 1, wherein the counted uncontrolled combustions are stored for a limited period of time, the stored uncontrolled combustions being taken into account in determining the number of uncontrolled combustions.

4. The method as recited in claim 1, wherein the monitoring period is within a driving cycle of the motor vehicle.

5. The method as recited in claim 1, wherein the monitoring period spans at least one driving cycle of the motor vehicle.

6. The method as recited in claim 1, wherein the temperature in the combustion chamber of the internal combustion engine is dropped by fuel enrichment in the internal combustion engine.

7. The method as recited in claim 1, wherein the temperature in the combustion chamber of the internal combustion engine is dropped by air enrichment in the internal combustion engine.

8. The method as recited in claim 1, wherein the temperature in the combustion chamber of the internal combustion engine is dropped by decreasing a charge to the internal combustion engine by reducing an air supply.

9. The method as recited in claim 1, wherein the temperature in the combustion chamber of the internal combustion engine is dropped by reducing an internal residual gas in the internal combustion engine by reducing an overlap of at least one of activation times of an intake valve and an exhaust valve of the internal combustion engine.

10. A device for handling uncontrolled combustions in an internal combustion engine of a motor vehicle, comprising:
a determining arrangement to determine, during a monitoring period, a number of detected uncontrolled combustions independent from the ignition by a spark plug based on structure-borne noise oscillations of the internal combustion engine, and to compare the determined number to a threshold value, a temperature in a combustion chamber of the internal combustion engine being dropped if the threshold value is exceeded;

wherein the uncontrolled combustions occur independently of ignition by a spark plug and are detected in or at the internal combustion engine, wherein there is a first measuring window for detecting knocking events of the normal combustions caused by the spark plug and a second measuring window which is situated with respect to time before the first measuring window for detecting the uncontrolled combustions independent from the ignition by a spark plug, wherein for detecting the uncontrolled combustions, a measuring window is activated as a function of the position of the structure-borne noise oscillations in comparison to a first crankshaft angular range, which is different from a second crankshaft angular range in which knock events of a controlled combustion are expected; and wherein if the at least one further threshold which is below the threshold value is exceeded, the temperature in the combustion chamber of the internal combustion engine is dropped to a lesser extent than when the threshold value is exceeded.

11. The device as recited in claim 10, wherein the determining arrangement includes a knock sensor connected to a control unit, the control unit including a counter to sum signals output by the knock sensor, and a memory device to store the threshold value, and wherein the control unit is configured to control an actuator to change the temperature in the internal combustion engine if the sum detected by the counter exceeds the threshold value.

12. The device as recited in claim 11, wherein each cylinder of the internal combustion engine has an intake valve for intake of air, and an exhaust valve for discharge of a combustion waste gas, as actuators, opening times of which are set by a separate camshaft in each case, and wherein the control unit is configured to control the camshafts in such a way that the opening times of the intake valve and of the exhaust valve one of do not overlap or overlap only slightly.

13. The method as recited in claim 1, wherein the number of uncontrolled combustions is compared to a second further threshold value, the second further threshold value being smaller than the threshold value and the further threshold value, and the temperature in the combustion chamber being dropped if the second further threshold value is exceeded, wherein the temperature drop due to the exceeding of the second further threshold value is smaller than the temperature drop due to the exceeding of the threshold value and the further threshold value.

\* \* \* \* \*